United States Patent
Niemoller et al.

(10) Patent No.: US 10,341,355 B1
(45) Date of Patent: Jul. 2, 2019

(54) CONFIDENTIAL MALICIOUS BEHAVIOR ANALYSIS FOR VIRTUAL COMPUTING RESOURCES

(71) Applicant: Amazon Technologies, Inc., Seattle, WA (US)

(72) Inventors: Albert Park Niemoller, Seattle, WA (US); Eric Jason Brandwine, Haymarket, VA (US); Keith Allen Bergen, Herndon, VA (US); Aaron Douglas Dokey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/747,988

(22) Filed: Jun. 23, 2015

(51) Int. Cl.
*H04L 29/06* (2006.01)
*H04L 29/08* (2006.01)
*G06N 20/00* (2019.01)
*G06F 21/55* (2013.01)

(52) U.S. Cl.
CPC .......... *H04L 63/105* (2013.01); *G06F 21/554* (2013.01); *G06N 20/00* (2019.01); *H04L 63/1408* (2013.01); *H04L 67/10* (2013.01)

(58) Field of Classification Search
CPC .. H04L 63/105; H04L 63/1408; G06F 21/554
See application file for complete search history.

(56) References Cited

U.S. PATENT DOCUMENTS

| | | | |
|---|---|---|---|
| 7,694,340 B2 | 4/2010 | Raman et al. | |
| 8,181,245 B2 | 5/2012 | Tripathi et al. | |
| 8,214,895 B2 | 7/2012 | Kuo et al. | |
| 8,464,335 B1 | 6/2013 | Sinha et al. | |
| 9,003,534 B2 | 4/2015 | Zubrilin et al. | |
| 9,104,859 B1* | 8/2015 | Banerjee | G06F 21/554 |
| 2005/0289649 A1* | 12/2005 | Mitomo | H04L 63/10 |
| | | | 726/22 |
| 2007/0050777 A1 | 3/2007 | Hutchinson et al. | |

(Continued)

OTHER PUBLICATIONS

Tudor, Valentin, Magnus Almgren, and Marina Papatriantafilou. "Harnessing the unknown in advanced metering infrastructure traffic." Proceedings of the 30th Annual ACM Symposium on Applied Computing. (pp. 2204-2211). ACM, 2015. (Year: 2015).*

(Continued)

*Primary Examiner* — Kari L Schmidt
(74) *Attorney, Agent, or Firm* — Robert C. Kowert; Meyertons, Hood, Kivlin, Kowert & Goetzel, P.C.

(57) ABSTRACT

A multi-tenant provider network may implement confidential data capture and analysis for virtual computing resources. Network traffic for virtual compute instances may be evaluated to identify possible malicious behavior of the virtual compute instances. In some embodiments, a stream of raw metering data for individual network communications to the virtual compute instances may be evaluated. A confidential analysis may be performed for identified virtual compute instances, evaluating confidential data utilized by the virtual compute instances for malicious software. Results of the confidential analysis may be generated according to an access policy that restricts access to the confidential data. The results may be provided to a client that is restricted from accessing the confidential data according to the access policy.

18 Claims, 8 Drawing Sheets

(56) References Cited

U.S. PATENT DOCUMENTS

| | | | | |
|---|---|---|---|---|
| 2010/0299763 | A1* | 11/2010 | Marcus | G06Q 10/06 726/30 |
| 2011/0197280 | A1 | 8/2011 | Young et al. | |
| 2013/0007845 | A1* | 1/2013 | Chang | G06F 21/62 726/4 |
| 2013/0024567 | A1* | 1/2013 | Roxburgh | G06F 11/3006 709/224 |
| 2013/0111217 | A1* | 5/2013 | Kopasz | G06F 21/6245 713/189 |
| 2013/0219172 | A1* | 8/2013 | Johnson | H04L 63/0272 713/153 |
| 2015/0294244 | A1* | 10/2015 | Bade | G06Q 10/063 705/7.11 |
| 2015/0355957 | A1* | 12/2015 | Steiner | G06F 11/0772 714/37 |
| 2015/0358205 | A1* | 12/2015 | Brophy | G06F 9/45558 709/224 |
| 2016/0065594 | A1* | 3/2016 | Srivastava | H04L 63/1408 726/23 |
| 2017/0099195 | A1* | 4/2017 | Raney | H04L 43/028 |

OTHER PUBLICATIONS

A. Jasti, P. Shah, R. Nagaraj and R. Pendse, "Security in multi-tenancy cloud," 44th Annual 2010 IEEE International Carnahan Conference on Security Technology, San Jose, CA, 2010, pp. 35-41. (Year: 2010).*

* cited by examiner

CONFIDENTIAL MALICIOUS BEHAVIOR ANALYSIS FOR VIRTUAL COMPUTING RESOURCES

BACKGROUND

Virtualization technologies have driven rapid growth in virtual or "cloud-based" systems, which may provide various public (or private) functions and services. Provider networks offer customers the opportunity to utilize virtualized computing resources on demand. Consumers of virtualized computing resources and storage, such as those offered by provider networks, can flexibly structure their computing and storage costs in response to immediately perceived computing and storage needs. For instance, virtualization allows customers of a provider network to purchase processor cycles and storage at the time of demand, rather than buying or leasing fixed hardware in provisioning cycles that are dictated by the delays and costs of manufacture and deployment of hardware. This lessens the need to accurately predict future demand as customers are able to purchase the use of computing and storage resources on a relatively instantaneous as-needed basis.

Virtualized computing resources allow customers of a provider network to implement custom or off-the-shelf software running on virtualization hosts, giving customers both the control of and responsibility for the behavior of virtual computing resources. As with other types of systems, virtual computing resources may become compromised with malicious software. Whether deployed due to ill intentions or as a victim of compromise, malicious software operating in a virtual computing resource of a provider network can be detrimental to the operation of the provider network and the experience of customers utilizing the provider network. For example, malicious network traffic may be generated, sent, and/or received by virtual computing resources compromised with malicious software, impacting network communications amongst other systems or resources within a provider network, or other systems external to the provider network (e.g., systems available over a public network, such as the Internet). Efforts to identify malicious behavior amongst virtual computing resources are challenging as large provider networks host thousands of different resources for thousands of different customers. Moreover, provider networks may provide confidentiality guarantees to customers for data utilized by virtualized computing resources, which may limit the effectiveness of malicious software detection techniques.

Figure 1:
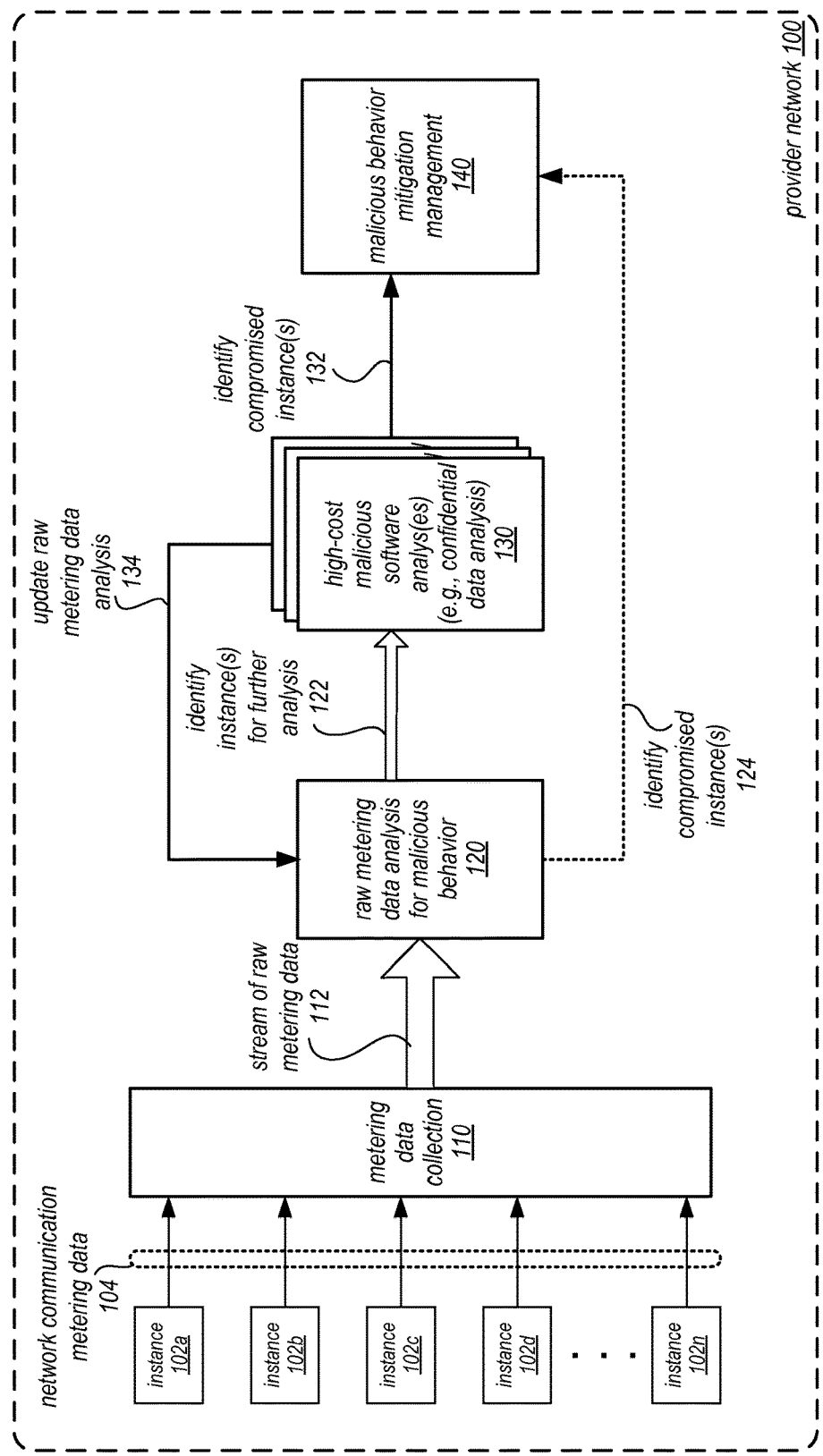
FIG. 1 is a logical block diagram illustrating malicious software identification based on raw metering data analysis and high-cost malicious behavior analysis, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement confidential malicious behavior analysis for virtual computing resources. Virtual computing resources may be offered by provider networks, allowing customers, users, or other clients of a provider network to operate virtual computing resources hosted by a provider network. These virtual computing resources, referred to herein as virtual compute instances, may be configured to operate customer-specified software (e.g., operating systems, applications, tools, services, etc.), which may be custom or off-the-shelf. For example, a customer of a provider network may procure a virtual compute instance to implement database software to implement a database server. The flexibility provided by utilizing virtual compute instances in a provider network allows customers to develop systems, services, or applications without investing in hardware resources for implementing the systems, services, or applications.

Allowing customers the freedom to specify software operating on virtual compute instances does create opportunities for bad actors to infiltrate virtual compute instances with malicious software. Malicious software may generally be any software that when executed operates against the requirements of the compromised virtual compute instance or other systems. Various examples of malicious software include computer viruses, worms, Trojan horses, ransomware, spyware, adware, or scareware. While some forms of malicious software may impact the particular virtual compute instance that is compromised, malicious software may be particularly problematic as compromised virtual compute instances may impact the performance of other virtual compute instances for other customers which are not compromised. A botnet infestation amongst multiple virtual compute instances of a provider network, for instance, may be used to spam or attack other virtual compute instances in the provider network.

Typically, identifying malicious software is an intrusive and costly process. Data, such as data stored in a root volume for a system, may be scanned or evaluated for various markers, artifacts, or indications of the presence of malicious software, such as performing signature-based detection, rootkit detection, or heuristics-based detection. Scanning large amounts of data is time consuming and burdensome on the operation of a system that utilizes the data. Moreover, access to the data is required to perform such techniques.

For operators of provider networks, the data of a virtual compute instance, such as a mounted or connected storage volume which includes an operating system and/or other applications implemented at a virtual compute instance, may be maintained under a service or terms of use agreement that provides security and confidentiality of data. For instance, many provider networks utilize multi-tenant hosting techniques to provide virtual computing services. Multi-tenant techniques may utilize the same set of physical resources, such as virtualization host or storage server, to provide resources to different customers, clients, or entities of the provider network. Multi-tenant provider networks may configure access policies and other safeguards to protect the data and operation of resources, such as the operation and data of virtual compute instances, from access by other customers, clients or entities including an operator of the provider network. Access policies may be enforced that restrict access to customer data so that unauthorized users do not access the data. For instance, maintenance operations, update operations, or other changes made to systems implementing a provider network by an operator of a provider network may still have to conform to the security and privacy of customer data established by the provider network. As malicious software may become installed, stored, located, deployed, or otherwise implemented at a virtual compute instance (either without knowledge or consent of the customer that owns the instance or willfully deployed by the customer that owns the instance), provider networks may be challenged to mitigate malicious behavior caused by malicious software operating at an instance without violating the security and privacy of customer data.

The scale of provider networks also offers challenges to identifying and mitigating malicious software at virtual compute instances. As provider networks are often large distributed networks, which may host thousands of computing resources along with various other subsystems, components, for a large numbers of clients, the resources necessary to perform high-cost techniques for identifying malicious software may exceed the capacity of a control plane or other control systems for a provider network to perform. Therefore, decisions to analyze virtual compute instances may be judiciously performed.

Confidential malicious behavior analysis may be implemented, in various embodiments, to provide a high-cost malicious software analysis that does not violate security and privacy guarantees for customer data. Moreover, such an analysis may be performed based on the results of other malicious behavior identification techniques that provide a more scalable and efficient way to intelligently select virtual compute instances for malicious software analysis, reducing the overall cost for identifying malicious software without sacrificing coverage for monitoring and mitigation that may be performed. FIG. 1 is a logical block diagram illustrating malicious software identification based on raw metering data analysis and high-cost malicious behavior analysis, according to some embodiments.

Provider network 100 may be a provider network that offers a variety of different virtual computing resources to clients, entities, or customers, of provider network 100. Storage resources, analytics, resources, or processing resources may be provisioned from provider network 100 and utilized on behalf of various clients of provider network 100. As illustrated in FIG. 1, instances 102a, 102b, 102c, 102d through 102n may be implemented as part of provider network 100 on behalf of various clients. Instances 102 may send various communications amongst provider network 100 or to external networks, systems, or devices (e.g., via a public network such as the Internet). Likewise network communications may be received from sources external to provider network 100 at different ones of instances 102 (or from other sources within provider network 100, such as other instances 102 or other systems, services, or devices within provider network 100.

In at least some embodiments, provider network 100 may implement metering data collection 110. Metering data collection 110 may track, identify, store, or otherwise collect information about individual network communications sent to and from instances 102. The network communication metering data 104 may be aggregated into a stream of raw metering data 112 which may be provided to other systems or services, such as raw metering data analysis, and/or a billing system which may generate customer usage bills based on the metering data. The stream of raw metering data may provide a ubiquitous view of individual network communications for instances 102, in various embodiments, such that the metering data describes all of the individual network communications sent to and from instances 102 may be included in metering data at any point in time. Thus, stream of raw metering data 112 may include a location or identifier, such as network address, of a source or destination of network communications from/to an instance 102 and an amount of data for the communications, such as a number of data packets communicated between the instance and the source/destination.

Provider network 100 may implement raw metering data analysis for malicious behavior 120 to identify suspect instances 102 that are possibly engaged in malicious behavior. For instance, raw metering data analysis for malicious behavior 120 may be performed by examining the metering data with respect to various malicious behavior criteria. In at least some embodiments, malicious behavior criteria may include an evaluation to determine whether a source/destination of network communications has a low reputation (e.g., a comparison with a list of known malicious actors). For those instances 122 that are identified as possibly malicious, a high-cost malicious software analysis 130 may be performed. High-cost analyses 130 for malicious software may include any type of malicious software analysis which may be impractical to perform for every instance 102. Examples include analyses that are computationally expensive, such as performing various kinds of behavior modeling analysis, or impose a detrimental performance burden upon the operation of the instance(s) to be analyzed. For instance, a confidential malicious software analysis may be performed which may analyze data stored in a storage volume mounted or connected to the identified instance according to one or more tests for malicious software. Capturing the confidential data (e.g., the storage volume) may negatively impact the performance of the instance utilizing the confidential data. Other confidential data that may be analyzed includes data residing in system memory for an identified instance or may be the content of network communications (e.g., user data inside of data packets). In some embodiments, the tests may be specified (e.g., by an operator, agent, or security personnel) for the detection of particular malicious software or types of malicious software.

Results of the high-cost malicious software malicious analysis may be used to identify compromised instances 132 to malicious behavior mitigation management 140. For instance, malicious behavior mitigation management 140 may provide notifications to clients of provider network 100 indicating the malicious software detected at an instance 102 provisioned for the client. Other responsive actions, such as isolating instances 102, performing repairs, or triggering investigative workflows may be performed. Results of the high-cost malicious software malicious analysis may also be used to improve raw metering data analysis for malicious behavior 120, as indicated at 134. For instances, positive or negative malicious software results may be stored, tracked, or analyzed, in order to train (e.g., via machine learning techniques) the different criteria, features, heuristics, or other information used to identify instance(s). As raw metering data analysis for malicious behavior 120 is improved, compromised instance(s) 124 may also be identified directly to malicious behavior mitigation management 140 based on the evaluation of the raw metering data (without performing high-cost analysis).

Please note that previous descriptions are not intended to be limiting, but are merely provided as logical examples of raw metering data analysis for malicious behavior and high-cost malicious software analysis. Various other components or arrangements of components may make up a provider network to provide malicious software identification based on raw metering data analysis and high-cost malicious behavior analysis. For instance multiple high-cost analysis techniques 130 may be implemented (e.g., techniques that analyze storage volumes, in-memory data, and/or network traffic data) and performed. Moreover, the data may undergo multiple iterations or analyses in order to update raw metering data analysis 134.

This specification next includes a general description of a provider network, which may implement confidential malicious software analysis for virtual computing resources. Then various examples of a network traffic monitoring service and a confidential data analysis service are discussed, including different components/modules, or arrangements of components/module that may be employed as part of implementing a network traffic monitoring service and a confidential data analysis service. A number of different methods and techniques to perform raw metering data analysis for malicious behavior and confidential malicious software analysis for virtual computing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
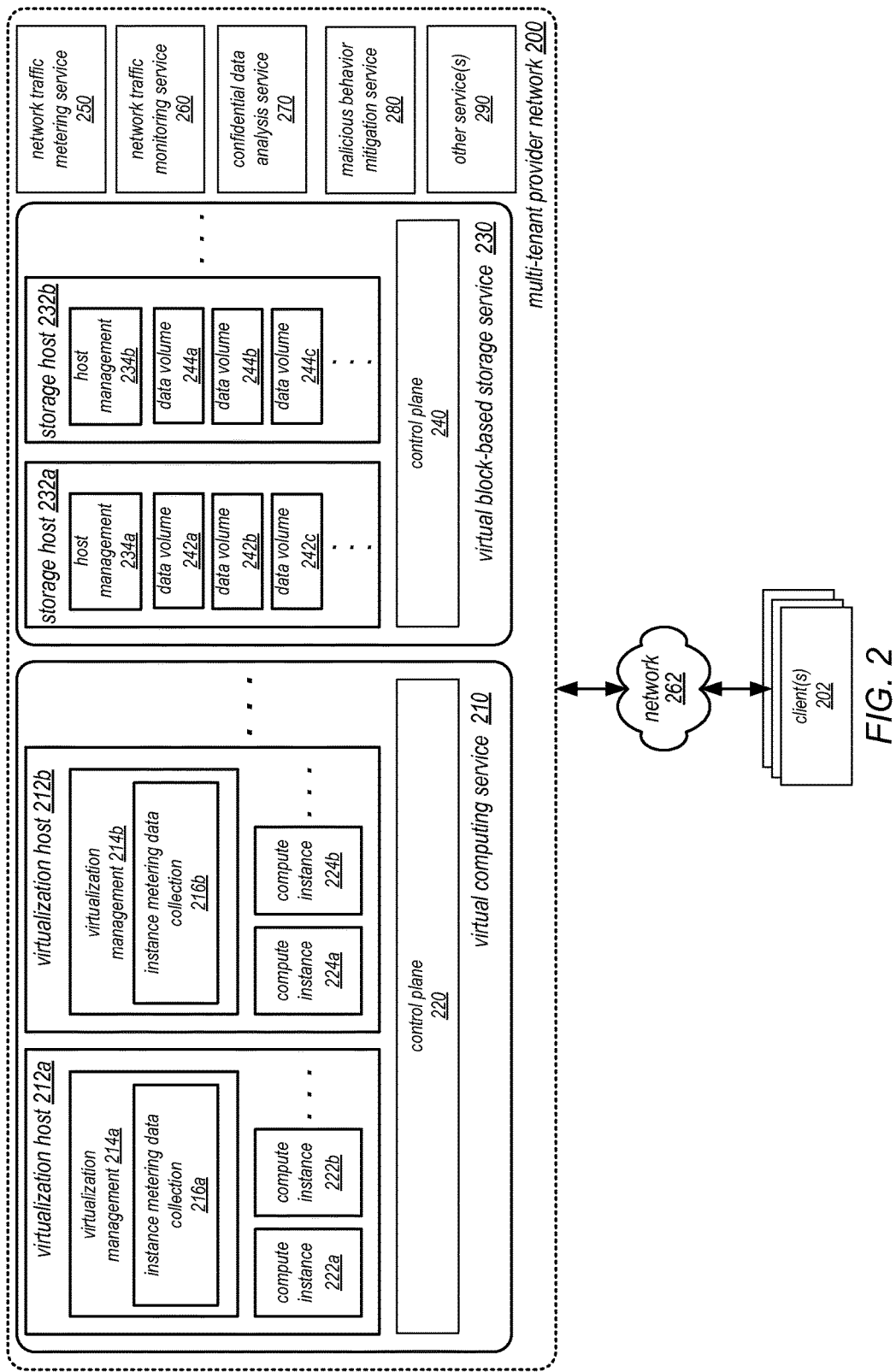
FIG. 2 is a logical block diagram illustrating a multi-tenant provider network that implements a confidential data analysis service, according to some embodiments.

FIG. 2 is a logical block diagram illustrating a multi-tenant provider network that implements a confidential data analysis service, according to some embodiments. Like provider network 100 discussed above, multi-tenant provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the multi-tenant provider network 200. In some embodiments, multi-tenant provider network 200 may provide computing resources. These computing resources may in some embodiments be offered to clients in units called "instances," 222*a*, 222*b* and 224*a*, 224*b* such as virtual or physical compute instances or storage instances. Likewise, in some embodiments, multi-tenant provider network 200 may provide storage resources, which may be offered to clients in units called data volumes, 242*a*, 242*b*, 242*c* and 244*a*, 244*b*, 244*c*, which may be virtual or physical block-based storage volumes.

Virtual computing service 210 may be implemented by multi-tenant provider network 200, in some embodiments. Virtual computing service 210 may offer instances 222 and 224 according to various configurations for client(s) 202 operation. A virtual compute instance 222 and 224 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 222 and 224 of multi-tenant provider network 200 in different embodiments, including general purpose or special purpose computer servers, storage devices, network devices and the like. In some embodiments instance client(s) 202 or other any other user may be configured (and/or authorized) to direct network traffic to a compute instance 202.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client (s) 202 applications, without for example requiring the client(s) 202 to access an instance. Applications (or other software operated/implemented by a compute instance 222 and 224 may be specified by client(s) 202, such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Figure 8:
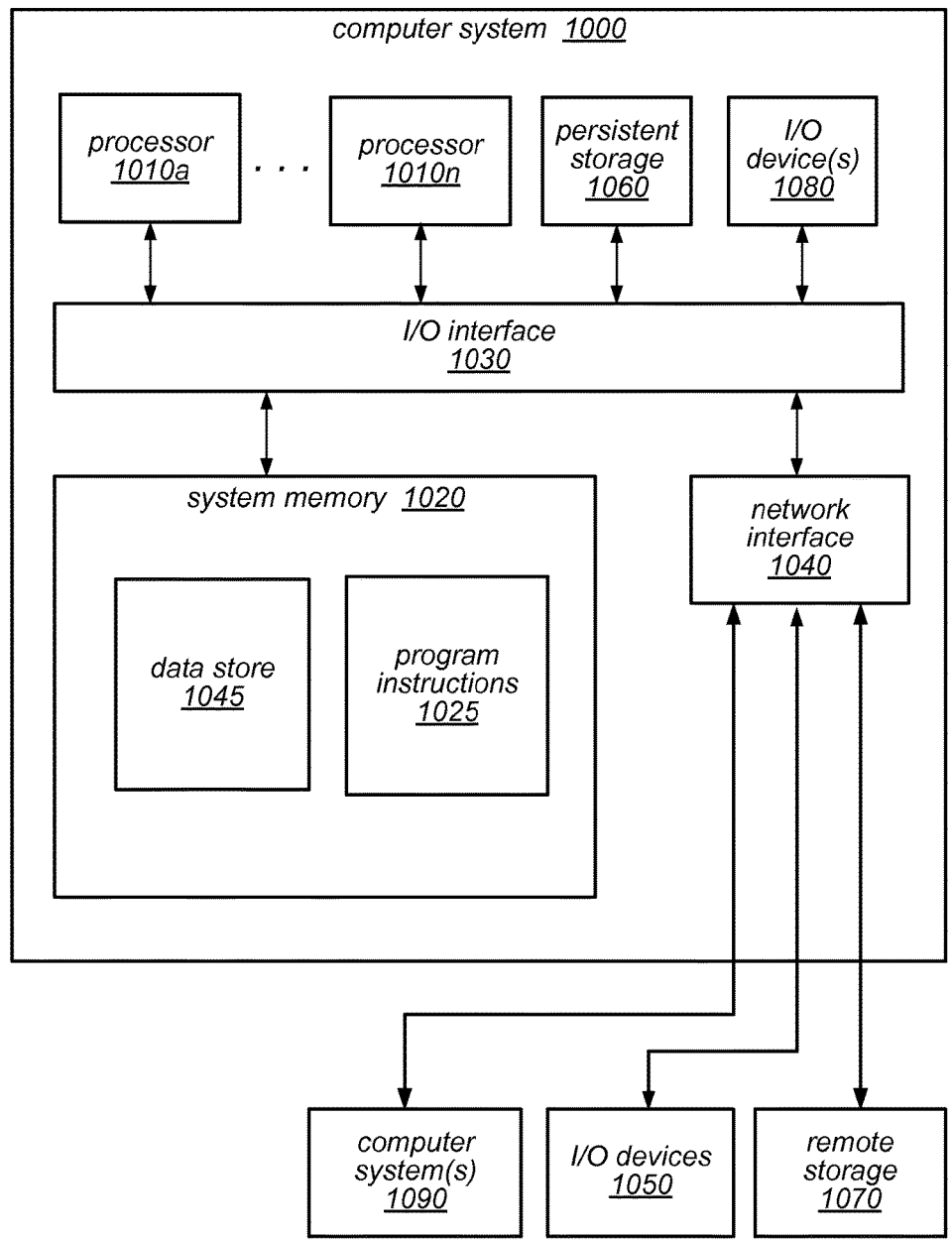
FIG. 8 is a block diagram illustrating an example computing system, according to some embodiments.

As illustrated in FIG. 2, a virtualization host, such as virtualization hosts 212a and 212b, may implement and/or manage multiple compute instances 222a, 222b, 224a, and 222b respectively, in some embodiments, and may be one or more computing devices, such as computing system 1000 described below with regard to FIG. 8. Virtualization hosts 212 may also provide multi-tenant hosting of compute instances. For example, in some embodiments, one virtualization host may host a compute instance for one entity (e.g., a particular client or account of virtual computing service 210), while another compute instance hosted at the same virtualization host may be hosted for another entity (e.g., a different account). A virtualization host may include a virtualization management module, such as virtualization management modules 214a and 214b capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 210 may implement control plane 220 to perform various management operations. For instance, control plane 220 may implement resource management to manage the access to, capacity of, mappings to, and other control or direction of compute instances offered by provider network. Control plane 220 may provide both a direct sell and 3$^{rd}$ party resell market for capacity reservations (e.g., reserved compute instances). For example, control plane 220 may allow clients 202 via to learn about, select, purchase access to, and/or reserve capacity for computing resources, either from an initial sale marketplace or a resale marketplace, via a web page or via an API. For example, control plane 220 may provide listings of different available compute instance types, each with a different credit accumulation rate. Control plane 220 may also offer and/or implement a flexible set of resource reservation, control and access interfaces for clients 202 via an interface (e.g., API). For example, control plane 220 may provide credentials or permissions to clients 202 such that compute instance control operations/interactions between clients and in-use computing resources may be performed.

In various embodiments, control plane 220 may track the consumption of various computing instances consumed for different virtual computer resources, clients, user accounts, and/or specific instances. In at least some embodiments, control plane 240 may implement various administrative actions to stop, heal, manage, or otherwise respond to various different scenarios in the fleet of virtualization hosts 212 and instances 222, 224. Control plane 220 may also provide access to various metric data for client(s) 202 as well as manage client configured alarms. In various embodiments, control plane 210 may implement billing management module. Control plane 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, multi-tenant provider network 200 may also implement virtual block-based storage service 230 for performing storage operations. Virtual block-based storage service 230 is a storage system, composed of a pool of multiple independent storage hosts 232a, 232b, and so on (e.g., server block data storage systems), which provide block level storage for storing one or more sets of data volumes data volume(s) 242a, 242b, 242c, and 244a, 244b, 244c. Data volumes 242, 244 may be mapped to particular client(s) (e.g., a virtual compute instance of virtual compute service 210), providing virtual block-based storage (e.g., hard disk storage or other persistent storage) as a contiguous set of logical blocks. For example, in various embodiments, compute instances 224 may mount, attach, map or otherwise connect to one or more data volumes 242 and/or 244 provided by virtual block-based storage service 230 in order to obtain persistent block-based storage for performing various operations. For example, in various embodiments a data volume may service as a boot volume or root volume, storing operating systems, applications, and/or other software executed on the compute instance mounting the respective boot volume. In some embodiments, a data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a storage host 224 maintaining a data volume, such as in another storage service 262. Snapshot operations may be performed to send, copy, and/or otherwise preserve the snapshot of a given data volume in another storage location, such as a remote snapshot data store in other storage service 262.

Storage hosts 232a, 232b may be one or more computing systems or devices, such as a storage server or other computing system (e.g., computing system 1000 described below with regard to FIG. 8). Each storage host may maintain respective replicas of data volumes. Some data volumes may differ in size from other data volumes, in some embodiments. Storage hosts may also provide multi-tenant storage. For example, in some embodiments, one storage host may maintain a data volume for one entity (e.g., a particular client or account of block-based storage service 230), while another data volume maintained at the same storage host may be maintained for another entity (e.g., a different account). Storage hosts may persist their respective data volumes in one or more block-based storage devices (e.g., hard disk drives, solid state drives, etc.) that may be directly attached to a computing system or device implementing the respective storage host. Storage hosts may implement different persistent storage devices. For example, some storage hosts may implement solid state drives (SSDs) for persistent block storage, while other storage hosts may implement hard disk drives (HDDs) or other magnetic-based persistent storage devices. In this way different volume types, specifications, and other performance characteristics may be provided according to the persistent storage devices implemented at the storage host.

Virtual block-based storage service 230 may manage and maintain data volumes in a variety of different ways. Host management 234a, 234b, may be implemented at storage hosts 232a and 232b respectively to manage data stored in different data volumes. Different durability schemes may be implemented for some data volumes among two or more storage hosts 232 as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, storage hosts may then coordinate I/O requests, such as write requests, among the two or more storage hosts maintaining a replica of a data volume. For example, for a given data volume, one storage host may serve as a master storage host. A master storage host may, in various embodiments, receive and process requests (e.g., I/O requests) from clients of the data volume. Thus, the master storage host may then coordinate replication of I/O requests, such as write requests, or any other changes or modifications to the data volume to one or more other storage hosts serving as slave storage hosts. Thus, when a write request is received for the data volume at a master storage host, the master storage host may forward the write request to the slave storage host(s) and wait until the slave storage host(s) acknowledges the write request as complete before completing the write request at the master storage host. Master storage hosts may direct other operations for data volumes, like snapshot operations or other I/O operations (e.g., serving a read request).

Please note, that in some embodiments, the role of master and slave storage hosts may be assigned per data volume. For example, for a data volume maintained at one storage host, the storage host may serve as a master storage host. While for another data volume maintained at the same storage host, the storage host may serve as a slave storage host.

Data may be maintained in data volumes 242, 244 in such a way as to provide security and privacy guarantees for client(s) 202. Host management 234a may enforce access policies for individual data volumes, restricting access to data in data volumes to those requestors that satisfy the access policy (e.g., by presenting appropriate identification or credentials). In this way, data stored in different data volumes on the same storage host for different clients may be confidentially maintained so that an unauthorized request to access data may not be processed (even if the requestor has the right to access another data volume hosted at the same storage host).

Virtual block-based storage service 230 may implement control plane 240 to assist in the operation of block-based storage service 230. In various embodiments, block-based storage service control plane 222 assists in managing the availability of block data storage to clients, such as programs executing on compute instances provided by virtual compute service 210 and/or other network-based services located within multi-tenant provider network 200 and/or optionally computing systems (not shown) located within one or more other data centers, or other computing systems external to provider network 200 available over a network 262. Access to data volumes 242, 244 may be provided over an internal network within provider network 200 or externally via network 262, in response to block data transaction instructions.

Block-based storage service control plane 240 may provide a variety of services related to providing block level storage functionality, including the management of user accounts (e.g., creation, deletion, billing, collection of payment, etc.). Control plane 240 may further provide services related to the creation, usage and deletion of data volumes 242, 244 in response to configuration requests. Control plane 240 may also provide services related to the creation, usage and deletion of volume snapshots on another storage service 262. Control plane 240 may also provide services related to the collection and processing of performance and auditing data related to the use of data volumes 242, 244 and snapshots of those volumes.

Figure 3:
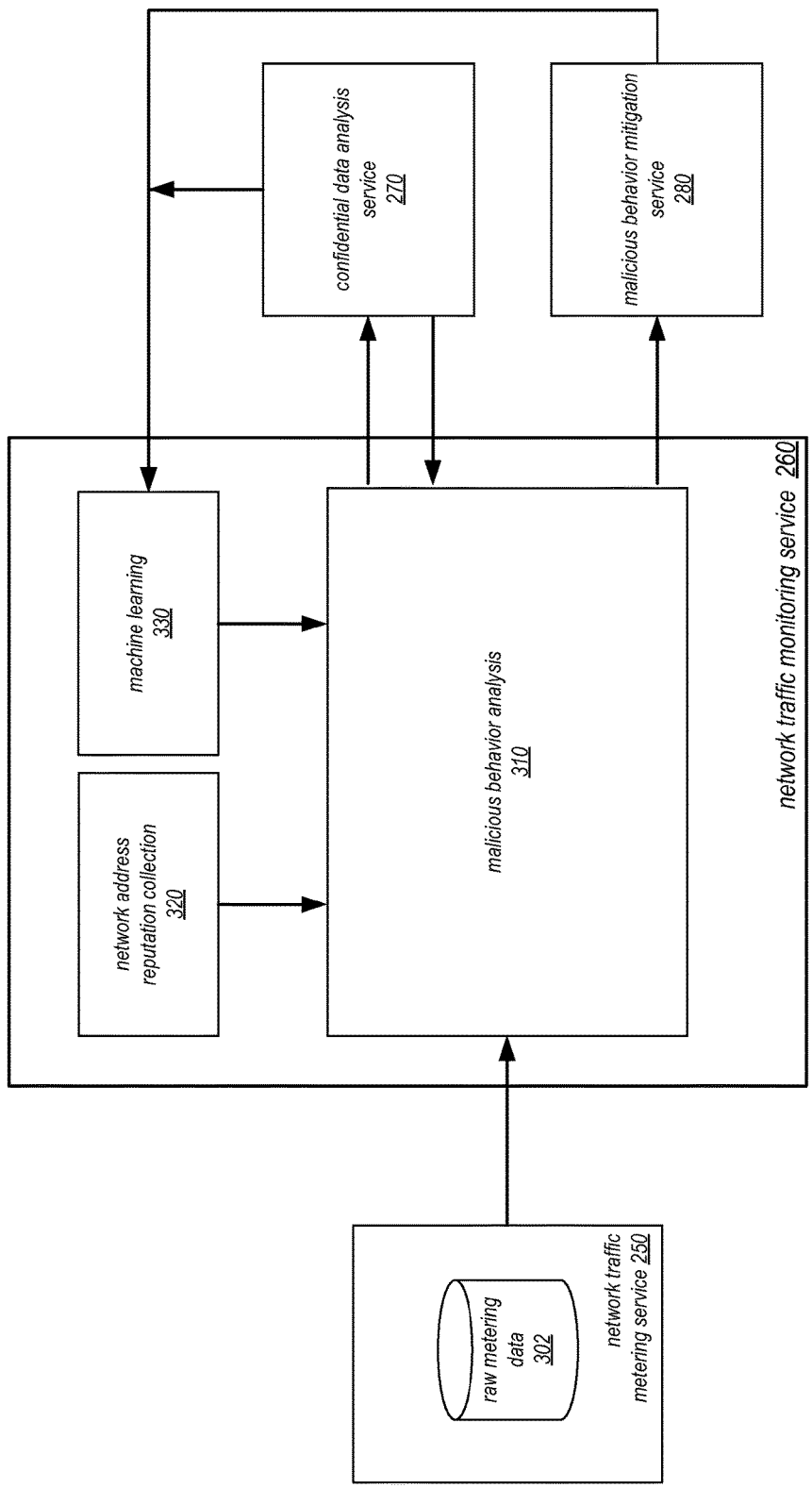
FIG. 3 is a logical block diagram illustrating a network traffic monitoring service, according to some embodiments.
Figure 4B:
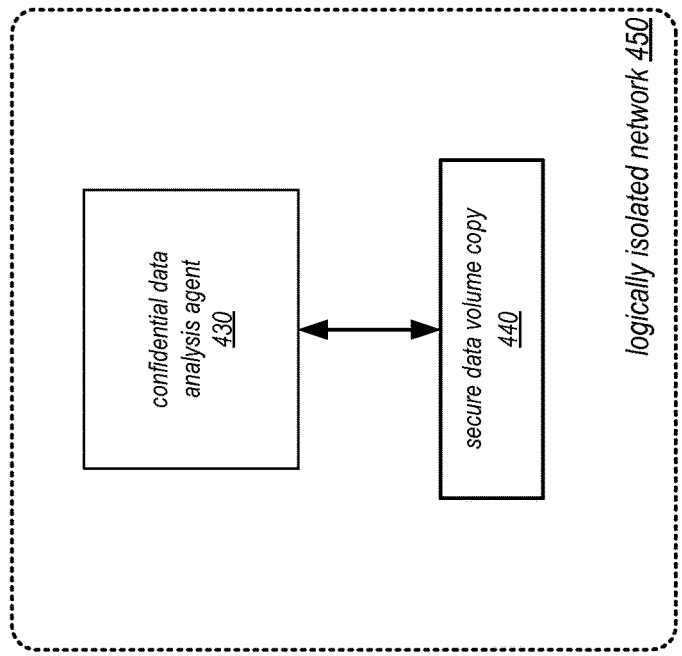
FIG. 4B is a logical block diagram illustrating a confidential data analysis agent interacting with a secure data volume copy, according to some embodiments.

Multi-tenant provider network 200 may implement network traffic metering service 250, in various embodiments, to collect metering data for network traffic directed to and from different resources in multi-tenant provider network 200 (e.g., data volumes, compute instances). Network traffic monitoring service 260 may be implemented as part of multi-tenant provider network 200 to evaluate computing resources (e.g., compute instances) for malicious behavior, in various embodiments. Multi-tenant provider network 200 may implement confidential data analysis 270 to perform an analysis of a data volume to detect malicious software without violating the security and privacy of data (e.g., without violating an access policy for a data volume). Multi-tenant provider network 200 may also implement malicious behavior mitigation service 280 to perform various mitigation actions for instances that are detected as having become compromised with malicious software. FIGS. 3-5 discuss network traffic metering service 250, network traffic monitoring service 260, confidential data analysis service 270 and malicious behavior mitigation service 280 in more detail below. Other services(s) 290, such as other storage services, analytics services, workflow services, deployment services, and/or networking services may be implemented, in some embodiments.

Clients 202 may encompass any type of client configurable to submit requests to multi-tenant provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at multi-tenant provider network 200 on behalf of a client 202.

Clients 202 may convey network-based services requests to provider network 200 via external network 262. In various embodiments, external network 262 may encompass any suitable combination of networking hardware and protocols necessary to establish network-based communications between clients 202 and provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with multi-tenant provider network 202 using a private network rather than the public Internet.

FIG. 3 is a logical block diagram illustrating a network traffic monitoring service, according to some embodiments. Network traffic monitoring service 260 may evaluate raw metering data 310 collected by network traffic metering service 250, perform malicious behavior analysis 310 based on various malicious behavior criteria. Network traffic monitoring service may also request further confidential data analysis from confidential data analysis service 270 (or from other high-cost analysis services, such as those discussed above with regard to FIG. 1) for virtual compute instances identified as possibly compromised with malicious software. For those virtual compute instances identified as compromised with malicious software (either by confidential data analysis service 270 or by malicious behavior analysis 310), network traffic monitoring service 260 report instances to a malicious behavior mitigation service 280.

Raw metering data 302 may be collected by network traffic metering service 250, in various embodiments. Raw metering data 302 may be a ubiquitous stream of metering data collected for network traffic directed to (ingress) and from (egress) virtual computing resources, such as virtual computing instances described in FIG. 2. Instead of sampling network traffic data for a portion of the virtual computing instances, network traffic metering service 250 collects metering data for all individual communications. For instance, a metering agent may be implemented as part of virtualization management (e.g., virtualization management 214a in FIG. 2) at a virtualization host (e.g., virtualization host 212a in FIG. 2). Virtualization hosts may include various hardware and/or software components managed by virtualization management to direct network traffic received at a virtualization host to the particular virtual compute instance identified as the recipient. Likewise virtualization management may direct network traffic generated and sent from virtual compute instances at a virtualization host out into the provide network. A metering agent may collect various information about the individual communications for each virtual compute instance (such as the source and destination network addresses for the communication, packet count, and byte counts along with identifying information such as an identifier for the virtual compute instance sending/receiving the communication and an identifier for a user account, user identifier, or entity that "owns" the virtual compute instance) and report the information to network traffic metering service 250. Network traffic metering service may, in various embodiments, aggregate and store the raw metering data 302 for subsequent analysis. For instance, in addition to providing access to network traffic monitoring service, other services such as a billing service (e.g., for provider network as a whole or as part of an individual control plane for a service, such as for virtual computing service 210) may access raw metering data 302.

Network traffic monitoring service 260 may access raw metering data 302 to monitor for malicious behavior amongst virtual computing resources in multi-tenant provider network 200. Due to the nature of raw metering data 302 providing metering data for network traffic for each virtual computing resource at all times, network traffic monitoring service 260 may perform various pre-processing techniques upon the raw metering data to filter out extraneous information (for the purposes of malicious behavior analysis). For instance, network traffic monitoring service 260 may normalize the raw metering data into a particular format for further processing and/or add in additional contextual data (e.g., classifying network addresses).

Malicious behavior analysis may be performed upon the raw metering data 302 to identify those instances that are or possibly compromised with malicious software. For instance, in at least some embodiments, malicious behavior analysis 310 may evaluate raw metering data with respect to one or more malicious behavior criteria. Malicious behavior criteria may be various heuristics, evaluations, and/or other determinations that may be made to evaluate whether malicious software is resident on virtual compute instance. For example, various evaluations may be performed with respect to source or destination of individual network communications, the size or amount of data sent to/received from a network address, and/or the frequency at which communications are made. In at least some embodiments, a malicious behavior criteria may be identify whether or not a source/destination network address for a communication is associated with malicious behavior. For example, network address reputation collection 320 may obtain listings of network addresses with low reputations. Known botnet command and control servers may be identified for instance. In some embodiments, network address reputation collection 320 may provide an interface to submit low reputation network addresses for consideration as part of malicious behavior analysis.

In some embodiments, a confidence score may be generated based on the malicious behavior analysis (e.g., comparing results of the one or more behavior criteria evaluations with models or other indicators of malicious behavior). The confidence score may be compared with different confidence thresholds, which correspond to different responsive actions. For instance, a high confidence threshold may indicate that the virtual compute instance has a high probability of comprise with malicious software. Therefore, the virtual compute instance may be identified to malicious behavior mitigation service 280 (bypassing confidential data analysis service 270). A lower confidence threshold may indicate that the virtual compute instance is suspected of having malicious software. Therefore, the virtual compute instance may be identified to confidential data analysis service 270 for further analysis. If neither confidence threshold is exceeded, then a virtual compute instance may be considered not malicious or safe to operate.

In some embodiments, indications of suspect instances may be published, identified, or sent to an operator or other agent for further investigation. An email or other message may be sent indicating suspect instances. In some embodiments, an operations or security management notification system (e.g., message board, problem ticketing system, etc.) may be updated with the identity of suspect virtual compute instances. An operator, agent, or other authorized user may access the indication of suspect instances for further evaluation (including sending a request to confidential data analysis service 270 to perform a confidential data analysis on a suspect virtual compute instance).

In at least some embodiments, network traffic monitoring service 260 may implement machine learning 330 to update, adjust, or improve malicious behavior analysis 310. For instance, machine learning techniques may be applied to results collected from confidential analysis service 270 as to whether or not a suspect virtual compute instance was compromised with malicious software in order to update the malicious behavior criteria, models, indicators or other information or techniques performed as part of malicious behavior analysis 310. Classification machine learning techniques, are one example of machine learning techniques, which may be used to identify those malicious behavior criteria most indicative of malicious behavior (or a particular type of malicious behavior), that may be modified based upon the results of confidential data analysis, and determining how the modification should be performed (e.g., adjusting weights applied to malicious behavior criteria to generate the confidence score as discussed above). Please note that many other machine learning techniques may be applied and thus the above example is not intended to be limiting. Similarly, the results from malicious behavior mitigation service, such as how identified virtual compute instances responded to mitigation techniques (e.g., whether or not a fix for a particular type of malicious software was successful), may be evaluated using machine learning 330 to update, adjust, or improve malicious behavior analysis 310.

Malicious behavior mitigation service 280 may perform various responsive or mitigation actions with respect to those virtual compute instances identified as compromised with malicious software. For example, in at least some embodiments, malicious behavior mitigation service may select one or multiple mitigation actions based on the virtual compute instance identified or a type or behavior of malicious software on the identified virtual compute instance. If a virtual compute instance is suspected of acting under the direction of malicious software as bot that is part of a botnet, then various automated network control measures may be taken, such as isolating or blocking the virtual compute instance from making further network communications. In some embodiments, malicious behavior mitigation service 280 may provide communications to various stakeholders of a provider network, such as a security team or other group responsible for network behavior, which may investigate whether the virtual compute instances was intentionally directed to perform the malicious behavior on the part of the instance "owner" or whether the instance is a victim of the malicious software. Communications or indications that virtual compute instance is compromised may be provided or sent a client associated with the virtual compute instance (e.g., sent to a contact email address associated with a user account that "owns") the device. Malicious behavior mitigation service may apply automated patches or fixes to compromised instances, or may provide instructions for removing the malicious software to the instance owner.

Figure 4A:
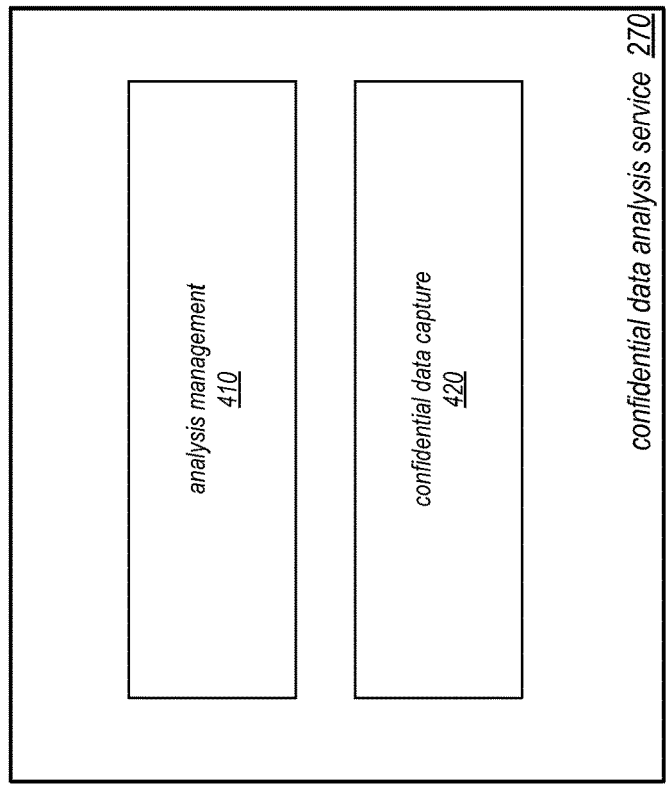
FIG. 4A is a logical block diagram illustrating a confidential data analysis service, according to some embodiments.
Figure 5:
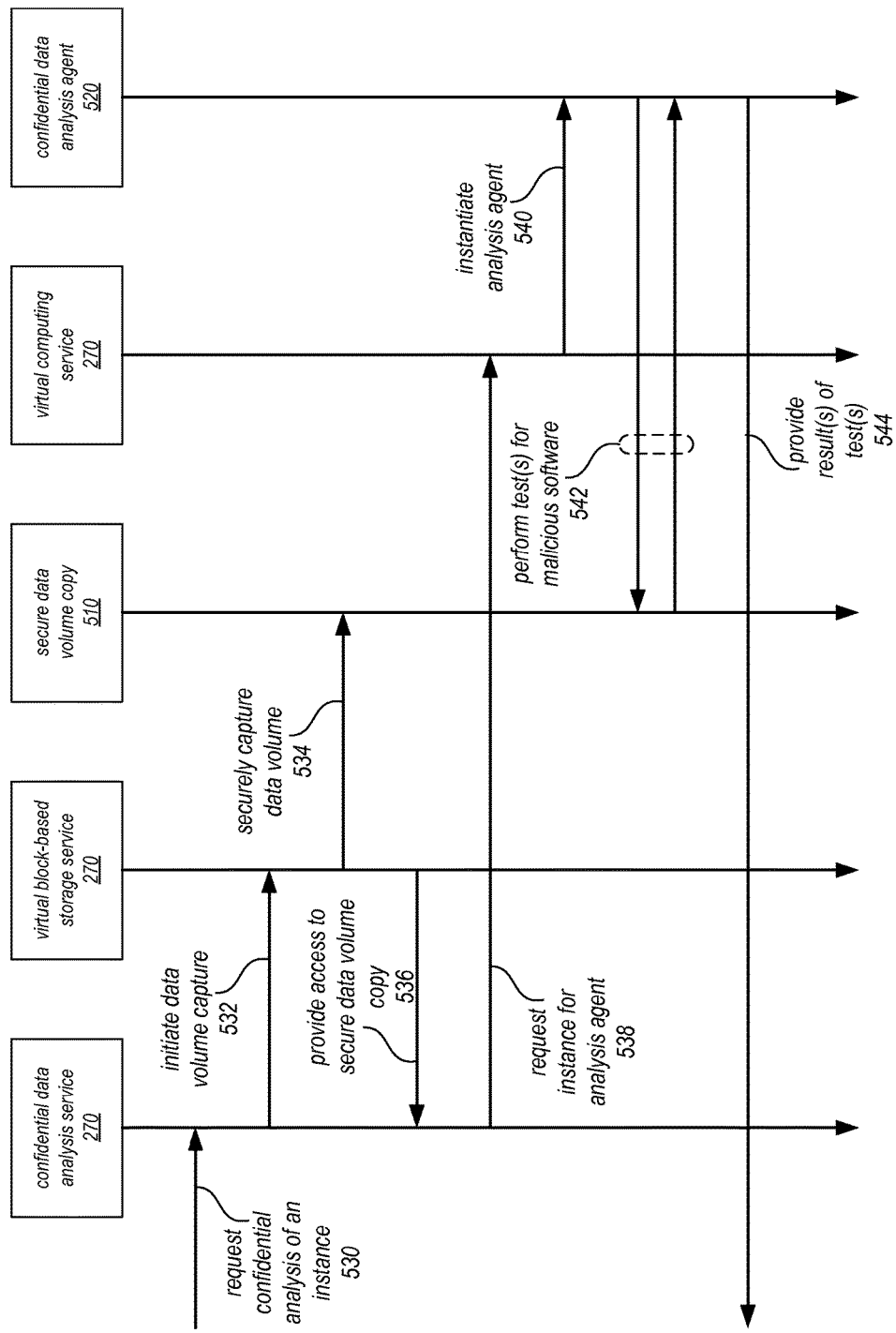
FIG. 5 illustrates interactions between a confidential data analysis service and other services of a multi-tenant provider network to provide a confidential analysis of a virtual compute instance, according to some embodiments.

FIG. 4A is a logical block diagram illustrating a confidential data analysis service, according to some embodiments. Confidential data analysis 270 may initiate a confidential data analysis of confidential data according to one or more tests for malicious software. Confidential data may, in various embodiments, be data stored in storage volume(s) mounted by a virtual compute instance, (e.g., data volumes of virtual block-based storage service in FIG. 2), data stored in-memory that is utilized by the virtual compute instance (e.g., data stored in portions of system memory at a virtualization host that is allocated to a virtual compute instance for performing different operations), and/or data stored in network communications sent to and from the virtual compute instance (e.g., user data included in network packets). Results may be generated based on the confidential data analysis which satisfy an access policy for the confidential data. The results may be provided to a client that is restricted from accessing the confidential data according to the access policy (which may be network traffic monitoring service 260 or another requestor, such as an operator, agent, or authorized user for multi-tenant provider network 200).

In at least some embodiments, confidential data analysis service may implement analysis management 410, which may process and/or handle requests to perform confidential analysis of virtual compute instance. For instance, analysis management agent 410 may instruct confidential data capture 420 to obtain a secure copy of the storage volume(s) 440 in FIG. 4B for analysis. Although not illustrated, similar data captures 420 may be performed to obtain in-memory data (e.g., a memory dump of memory allocated to the virtual compute instance) or data included in network packets (e.g., copying, reading, or inspecting the payload or data carried on behalf of the virtual compute instance in network packets). Confidential data capture 420 may, for instance, be implemented as part of confidential data analysis service 270 to copy data on the storage volumes and place the data in a secure data volume copy (as illustrated in FIG. 4B). The copy 440 may be encrypted or otherwise secured from unauthorized access that violates the access policy for the storage volume(s). Likewise, other confidential data (e.g., in-memory data or network communication data) may be captured and stored in a secure data volume. In at least some embodiments, the secure copy 440 may be stored as a data volume in virtual block-based storage service 230. Access credentials, such as an encryption key, may be provided to analysis management 410 along with a notification that capture has occurred, in various embodiments. Please note that in some embodiments, another service, such as virtual block-based storage service as described below with regard to FIG. 5 may perform confidential data capture.

Once a secure data volume copy is created, analysis management may launch or instantiate a confidential data analysis agent 430 in FIG. 4B in a logically isolated network 450 along with secure data volume copy 440. Confidential data analysis agent 430 may be configured by analysis management to perform test(s) to detect malicious software in secure data volume copy 440. Analysis management 410 may be configured to direct the performance of multiple confidential data analyses, tracking the status of the various analyses, managing and launching confidential data analysis agents for the different storage volumes to be analyzed, and providing results of the tests to clients. In at least some embodiments, analysis management 410 may throttle or limit the number of confidential data analysis. For example, analysis management 410 may track the number of confidential data analyses being performed for a particular test or type of malicious software. Confidential data analysis may reject or buffer other requests for the particular test or type that exceed some performance threshold for the test or type (either a threshold for a current number of analyses of the particular test being performed, which would allow future tests when current tests complete, or a threshold for total number of tests to be performed, which would prevent the performance of any subsequent analysis for the particular test). In this way, resources to perform confidential data analysis may not be wasted to perform the same particular test if knowledge gained from previous tests provides sufficient understanding to recognize the malicious software with performing a confidential data analysis. In at least some embodiments, analysis management 410 may delete, remove or deactivate resources, such as confidential analysis agent 430 and secure data volume copy 440, when the confidential analysis is complete.

FIG. 4B is a logical block diagram illustrating a confidential data analysis agent interacting with a secure data volume copy, according to some embodiments. As noted above a confidential analysis agent 430 may be launched to perform confidential data analysis with respect to a secure data volume copy 440. Confidential data analysis agent 430 may, in various embodiments, be a virtual compute instance, such as may be provided by virtual computing service, that is configured to mount the secure data volume copy 440. An encryption key or other access credential may be provided to confidential analysis agent 430 in order to access the secure data volume copy 440.

Confidential data analysis agent 430 may be configured to comply with the access policy for the confidential data (e.g., storage volume(s), in-memory data, or network communication data) by prohibiting transfer of data in secure data volume copy 440 to any external system or device. In some embodiments, confidential data analysis agent 430 may be located in logically isolated network 450, which may filter, block, or restrict communications to confidential data analysis agent 430 as if it were situated in a physically isolated network. Confidential data analysis agent 430 may be configured to perform specified tests for malicious software (by a requestor of the analysis or a default set of test(s)). Tests may be custom tests uploaded to confidential data analysis service 270 or may be off-the-shelf malicious detection applications that perform various tests. The results generated from the tests may be generated in compliance with the access policy, providing no data from the confidential data but instead providing information indicating whether or not particular test(s) identified malicious software (e.g., binary information, such as positive or negative results for different tests—"Malware A—NO; Malware B—YES; Malware C—NO"). Results may be provided to confidential data analysis service 270, directly to clients requesting the analysis, or to a storage location, communication service, or other system which may provide the results to a requesting client.

FIG. 5 illustrates interactions between a confidential data analysis service and other services of a multi-tenant provider network to provide a confidential analysis of a virtual compute instance, according to some embodiments. A request for confidential analysis of an instance 530 may be received at confidential data analysis service. The request 530 may indicate an instance identifier or other information to identify the instance to analyze. In some embodiments, the request 530 may specify one or more tests to perform for malicious software. The request 530 may be received via an interface, such as a programmatic interface (e.g., API) and/or graphical user interface (e.g., website or other network-based site). Clients may be another system or service within a multi-tenant provider network, such as network traffic monitoring service 260 or a client associated with an operator or agent for the multi-tenant provider network to manually request a confidential data analysis. In at least some embodiments, confidential data analysis service may be utilized to provide a public interface to clients, users, and/or customers of a multi-tenant provider network, in order to perform confidential data analysis upon data volumes associated with the requesting client, user, and/or customer. Similarly, confidential data analysis service may be requested for the performance of a confidential data analysis on a storage volume image, such as boot volume image or machine image, which may be used to validate the storage volume image prior to being mounted to a virtual compute instance (or made available to $3^{rd}$ parties to utilize for operating a virtual compute instance).

Confidential data analysis service 270 may initiate data volume capture 532, sending a request to virtual block-based storage service 270 to obtain access to a secure copy of data volume(s) 510 mounted to the requested instance. Access to the security data volume copy may be provided 536 to confidential data analysis service. Confidential data analysis service may then request an instance for an analysis agent 538 from virtual computing service 270. The request may specify the particular tests, such as the particular test software to operate on the confidential data analysis agent, along with the access credentials to access secure data volume copy 510. Virtual computing service 270 may instantiate 540 the analysis agent 520, provisioning a virtual compute instance to operate as confidential data analysis agent 520 as requested by confidential data analysis service 270.

Confidential data analysis agent 520 may access secure data volume copy 510 to perform test(s) for malicious software 542. The access granted to perform tests may not remove any data from secure data volume copy, in various embodiments, in order to prevent data from being obtained in violation of the access policy for the data volume. Results may generated, which also conform to the restrictions of the access policy, and may be provided 544 in response to the request 530.

Please note that the interactions discussed above in FIG. 5 with regard to perform confidential data analysis for malicious software are examples. Various other systems, components, and/or devices may be added or removed. For instance, a dedicated data capture service may be implemented to obtain secure data volumes. Similarly, an automated deployment system may perform the interactions with the virtual computing service to provision a confidential data analysis agent. Additionally, other forms of confidential data (e.g., in-memory data or data in network communications) may be captured and analyzed using similar techniques. Thus, the previous discussion is not intended to be limiting.

Figure 6:
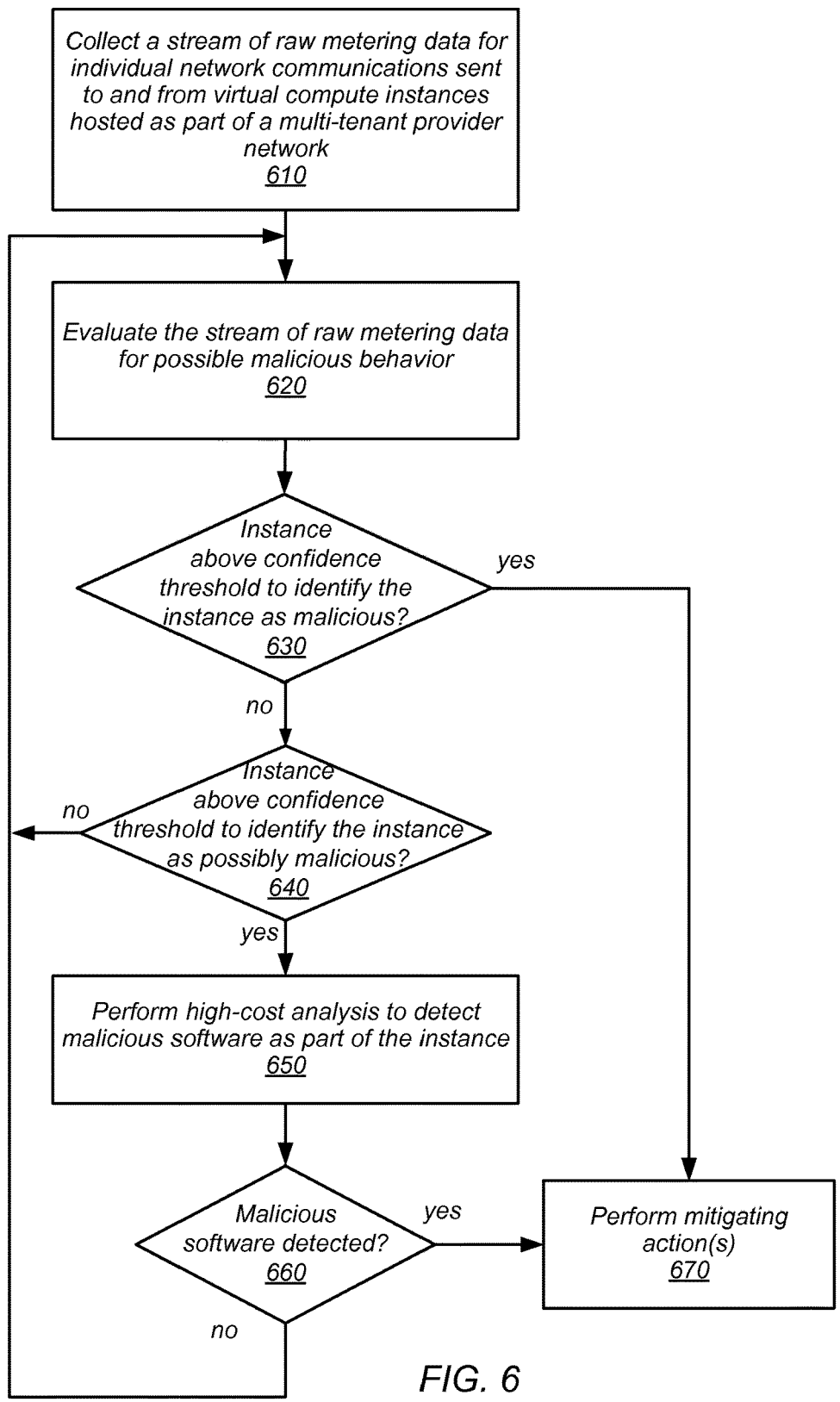
FIG. 6 is high-level flowchart illustrating various methods and techniques for monitoring a stream of raw metering data to identify instances as malicious and perform a high-cost analysis to detect malicious software, according to some embodiments.

The examples of implementing confidential data analysis for malicious software in virtual computing resources as discussed above with regard to FIGS. 2-5 have been given in regard to virtual computing resources offered by a multi-tenant provider network. Various other types or configurations of distributed systems or services may implement these techniques. Other virtual computing resources providers, which may offer some form of confidentially maintained resources subject to malicious software compromise may implement these techniques. FIG. 6 is high-level flowchart illustrating various methods and techniques for monitoring a stream of raw metering data to identify instances as malicious and perform a high-cost analysis to detect malicious software, according to some embodiments. Various ones of the systems described above may implement some or all of these techniques.

As indicated at 610, a stream of raw metering data may be collected for individual network communications sent to and from virtual compute instances hosted as part of a multi-tenant provider network. As discussed above, the stream of raw metering data may include the source and destination network addresses for the communication, packet count, and byte counts along with identifying information such as an identifier for the virtual compute instance sending/receiving the communication and an identifier for a user account, user identifier, or entity that "owns" the virtual compute instance.

The stream of raw metering data may be evaluated for possible malicious behavior, as indicated at 620, in various embodiments. The evaluation of raw metering data may be performed with respect to one or more malicious behavior criteria. Malicious behavior criteria, as noted above, may be various heuristics, evaluations, and/or other determinations that may be made to evaluate whether malicious software is resident on a virtual compute instance, such as evaluations performed with respect to source or destination of individual network communications, the size or amount of data sent to/received from a network address, and/or the frequency at which communications are made. Malicious behavior criteria may identify whether or not a source/destination network address for a communication is associated with malicious behavior. Malicious behavior criteria may include communications with low reputation network addresses (e.g., communications with botnet command and control servers). Other malicious behavior criteria may include amount of data sent in communications, the rate or frequency at which communications are sent, they types, numbers, or arrangements of communications sent to or received from network addresses, or any other indicator included in the stream of raw metering data which may be evaluated. As noted earlier in FIG. 1, machine learning and other statistical analysis techniques may be implemented to adjust the criteria, add new criteria, removing criteria, or modifying the weighting of criteria when evaluating the stream of raw metering data.

A confidence score or other measure of probability of malicious behavior compromise may be generated for virtual compute instances, in various embodiments. The confidence score may weight one or more evaluations with respect to different malicious behavior criteria together in order to generate the confidence score. In some embodiments, the confidence score may be generated based on communications with low reputation network addresses. As indicated at 630, if, a confidence score is above a threshold to identify an instance as malicious, the virtual compute instance may be identified as engaged in malicious behavior, as indicated by the positive exit from 630. Then mitigating actions may be performed, as indicated at 670. Instances that are not above the confidence threshold may be measured against other confidence thresholds to determine if other analysis actions for malicious software should be taken. For example, an instance may still possibly be compromised with malicious software. The evaluation may generate a confidence score for the instance that is above a threshold to identify the instance as possibly engaging in malicious behavior, and therefore may be identified for high-cost analysis, as indicated by the positive exit from 640. Otherwise, metering data for another instance may be evaluated, as indicated by the negative exit from 640 back to element 620.

A high-cost analysis may be performed to detect malicious software as part of the instance, as indicated at 650. For example, a confidential data analysis, such as described above with regard to FIGS. 4A-5 and below with regard to FIG. 7 may be performed. Alternatively, other computationally intensive analysis, such as various modeling, prediction, and other behavioral analysis may be performed, which due to performance costs, can only be performed for a small subset of virtual computing instances in the multi-tenant provider network. For example, historical behavior data for malicious software may be accessed and evaluated using advanced arithmetical techniques (e.g., matrix calculations to determine common features or classify virtual compute instance behavior), which may require sufficient processing resources to limit the number of analyses that can be performed. The results of the high-cost analysis may determine whether or not malicious software is detected, if so, as indicated by the positive exit from 660, then mitigating action(s) may be performed, as indicated 670. Mitigating actions, as discussed above, may include notifying stakeholders, such as operators or agents of a multi-tenant provider network or customers associated with the identified instance, isolating the instance from network communications, or performing automated repair actions to remove the malicious software. As discussed above with machine learning 330 in FIG. 3, the results of high-cost analysis 650 may be used to update malicious behavior criteria used for the evaluation at element 620.

Figure 7:
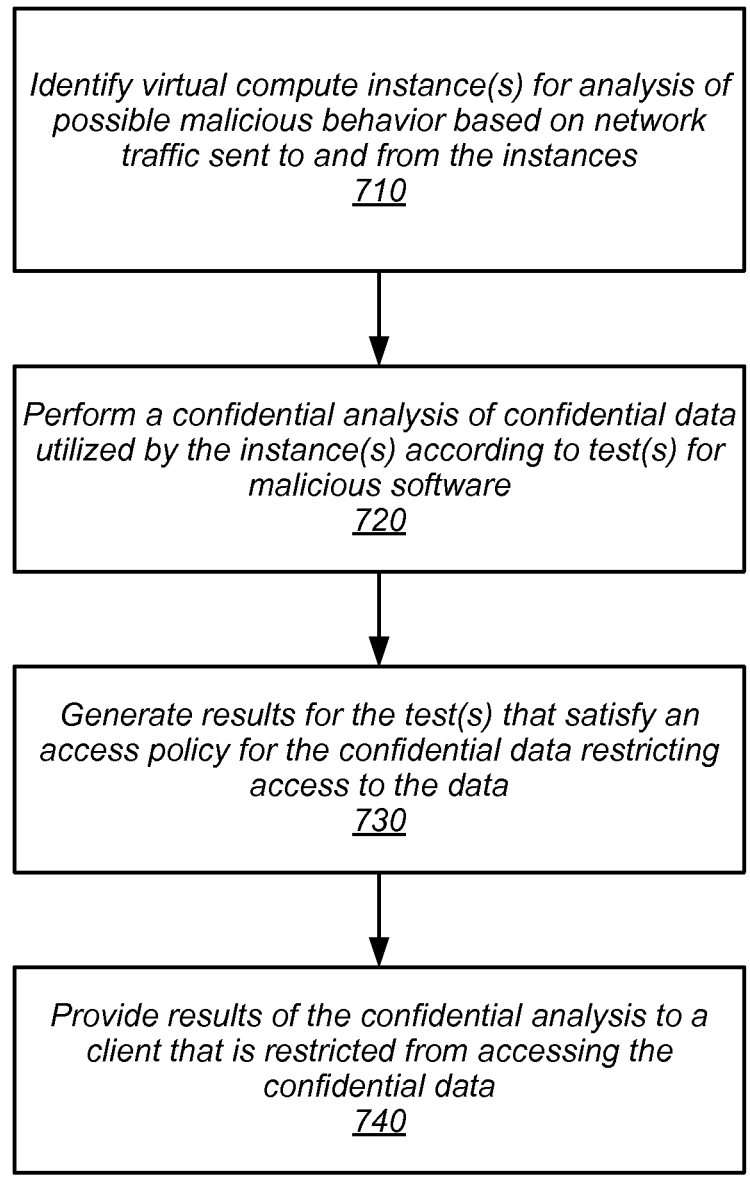
FIG. 7 is a high-level flowchart illustrating various methods and techniques for performing confidential malicious behavior analysis for virtual computing resources in a provider network, according to some embodiments.

Confidential data analysis may be performed as a high-cost secondary analysis, such as discussed above with regard to FIG. 6, or may be performed instances identified for analysis via other means. In at least some embodiments, clients may manually request the performance of confidential data analysis, as discussed above with regard to FIG. 5. FIG. 7 is a high-level flowchart illustrating various methods and techniques for performing confidential malicious behavior analysis for virtual computing resources in a provider network, according to some embodiments.

As indicated at 710, virtual compute instance(s) may be identified for analysis of possible malicious behavior based on network traffic sent to and from the instances. For example, a behavioral analysis of the stream of raw metering data, as discussed above with regard to FIG. 6, may be performed to identify instances possibly engaged in malicious behavior. In some embodiments, virtual compute instances may be identified if network traffic is detected which is sent to or received from network addresses known to be associated with malicious software (e.g., on a black list). Other techniques for analyzing network traffic data, such as sampling the network traffic data for indications of malicious behavior may also be implemented. In addition to analyzing network traffic data, in some embodiments other attributes for instances may be evaluated. Attributes may include the configuration of the virtual compute instance (e.g., particular security settings or controls for the virtual compute instance). Attributes may also describe the virtual compute instance's relationship to other resources in the provider network. For example, a virtual compute instance may be included in a physical or logical grouping of other resources, such as other virtual compute instances, which are organized or structured in particular way (e.g., enforcing a common set of security features or behaviors). Analysis of these attributes may also provide further indication that a virtual compute instance may be engaged in possibly malicious behavior.

As indicated at 720, a confidential analysis of confidential data may be performed according to test(s) for malicious software. The confidential analysis may analyze confidential data utilized by the virtual compute instance(s), such as data stored in storage volumes mounted to the instance(s), data stored in-memory for the virtual compute instances, or data included in network communications of the virtual compute instances, without providing access to the confidential data to unauthorized users, clients, systems, or devices. Moreover, the malicious software tests themselves may not collect, copy, send, or remove from the confidential data protected according to the access policy. Tests for malicious software may be previously specified for the instance, or may be a default set of tests identified for the virtual compute instance(s). As indicated at 730, results for the test(s) may be generated that satisfy the access policy for the mounted storage volume(s). For instance, the tests results may provide binary data, indicating a positive or negative result for different malicious software types which may be detected at a storage volume.

In at least some embodiments, the results of the confidential analysis may be provided to a client that is restricted from accessing the mounted storage volume(s), as indicated at 740. For instance, the client may be an automated traffic security system or may be a system that provides network analysis for security system agents, managers, and/or developers of a multi-tenant provider network. Results may be forwarded on to users, clients, or entities that "own" or operate the virtual compute instance, in some embodiments.

The techniques described above with regard to FIG. 7 may be performed in response to requests from clients to perform confidential data analysis upon instances, storage volumes, or images of storage volumes. In some embodiments, a metric gathering or monitoring service that allows users to specify alarms that trigger events may be used to trigger an analysis event that performs the confidential data analysis described above in response to the analysis event. An analysis event may be triggered, for instance, when a specified condition, such as processor load, network load, or any other defined activity or behavior for an instance being monitored is met. For instance, if processing workload exceeds a specified threshold or bandwidth level for a virtual compute instance, an analysis event may be triggered for the virtual compute instance to perform confidential analysis on confidential data utilized by the virtual compute instance.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of confidential data analysis for malicious software at virtual computing resources as described herein may be executed on one or more computer systems, which may interact with various other devices. FIG. 8 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a multi-tenant provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations, though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of computing nodes implemented by one or more hardware processors that host one or more virtual compute instances as part of a multi-tenant provider network for computing resources, wherein the virtual compute instances mount one or more block-based storage volumes, wherein access to data stored in the block-based storage volumes is restricted according to an access policy;
a network traffic metering service implemented by one or more hardware processors for the provider network configured to collect a stream of raw metering data for individual network communications sent to and from the virtual compute instances hosted at the plurality of computing nodes;
a network traffic monitoring service implemented by one or more hardware processors, configured to:
evaluate the stream of raw metering data for possible malicious behavior; and
identify, based at least in part on the evaluation of the raw metering data, different ones of the respective virtual compute instances for storage volume analysis in regard to possible malicious behavior; and
a confidential volume analysis service implemented by one or more hardware processors, configured to:
subsequent to identification of the different ones of the respective virtual compute instances for storage volume analysis, receive a request from a client to analyze one of the identified virtual compute instances, wherein the client is restricted from accessing the data stored in the one or more block-based storage volumes mounted to the one of the identified virtual compute instances according to the access policy;
in response to the receipt of the request:
perform a confidential analysis of the data stored in one or more of the block-based storage volumes mounted to the one of the identified virtual compute instances according to one or more tests for malicious software, wherein results generated for the one or more tests of the confidential analysis satisfy the access policy for the one or more block-based storage volumes; and
send the one or more results of the confidential analysis to the client.

2. The system of claim 1, wherein to evaluate the stream of raw metering data for possible malicious behavior, the network traffic monitoring service is configured to identify network traffic communications between the virtual compute instances and one or more network addresses associated with malicious behavior.

3. The system of claim 1, wherein the network monitoring service is the client and wherein the network monitoring service is further configured to:
based, at least in part, on the received one or more results of the confidential analysis, provide a notification indicating that the one of the identified virtual compute instances is compromised with malicious software, to a user account associated with the virtual compute instance.

4. The system of claim 1, wherein the evaluation of the stream of raw metering data for possible malicious behavior is performed with respect to one or more malicious behavior criteria, and wherein the network monitoring service is the client and wherein the network monitoring service is further configured to:
based, at least in part, on the received one or more results of the confidential analysis, update the one or more malicious behavior criteria for subsequent evaluation of the stream of raw metering data.

5. A method, comprising:
performing, by one or more computing devices:
collecting a stream of raw metering data for individual network communications sent to and from a plurality of virtual compute instances of a multi-tenant provider network, wherein the plurality of virtual compute instances are implemented as part of a multi-tenant provider network for computing resources;
evaluating the stream of raw metering data for possible malicious behavior;
identifying, based at least in part on the evaluation of the stream of raw metering data, one or more virtual compute instances of the plurality of virtual compute instances for storage volume analysis of possible malicious behavior, wherein data is stored on one or more storage volumes mounted on the one or more virtual compute instances, and wherein access to the data is restricted according to an access policy;
subsequent to identification of the one or more virtual compute instances for storage volume analysis, performing an analysis of the data stored on the one or more storage volumes mounted on the one or more virtual compute instances identified from the evaluation of the stream of raw metering data associated with network traffic sent to and from the plurality of virtual compute instances, wherein the analysis is performed according to one or more tests for malicious software, and wherein results generated for the one or more tests of the analysis satisfy the access policy for the data; and
providing the results of the analysis to a client, wherein the client is restricted from accessing the data.

6. The method of claim 5, wherein evaluating the stream of raw metering data is performed with respect to one or more malicious behavior criteria, and wherein the method further comprises:
based, at least in part, on the one or more results of the confidential analysis, performing one or more machine learning techniques to update the one or more malicious behavior criteria for subsequent identification of virtual compute instances for analysis to detect malicious software.

7. The method of claim 6, further comprising evaluating the stream of raw metering data with respect to the updated one or more malicious behavior criteria to identify at least one of the plurality of virtual compute instances as compromised with malicious software.

8. The method of claim 5, wherein the data comprises:
data stored on one or more block-based storage volumes mounted to the one or more virtual compute instances;
data stored in memory for the one or more virtual compute instances; or
data in network communications sent to and from the one or more virtual compute instances.

9. The method of claim 5, wherein the identifying, the performing, and the applying are performed by a confidential analysis service, wherein the client is a malicious behavior mitigation service, and wherein the method further comprises:
based, at least in part on the one or more results of the analysis, performing, by the malicious behavior mitigation service, at least one of:
sending a notification indicating that one of the one or more virtual compute instances is compromised with malicious software, to a user account associated with the one virtual compute instance; or
isolating the one virtual compute instance in the multi-tenant provider network to block further network communications sent to or from the one virtual compute instance.

10. The method of claim 5, further comprising:
receiving a request from the client to analyze the one or more virtual compute instances, wherein the request specifies the one or more tests for malicious software to perform; and
wherein the performing the analysis and the providing the results are performed in response to receiving the request.

11. The method of claim 5, further comprising:
detecting an analysis event for another one of the plurality of virtual compute instances, wherein the analysis event is triggered according to a user-specified alarm for the other virtual compute instance; and
in response to detecting the analysis event, performing the analysis and the providing the results with respect to the other virtual compute instance.

12. The method of claim 5, wherein the plurality of virtual compute instances are offered by the multi-tenant provider network as part of a virtual computing service, wherein different ones of the plurality of virtual compute instances are associated with different user accounts of the multi-tenant provider network, wherein the access policy for the one or more virtual compute instances restricts access to requests associated with those user accounts of the different user accounts associated with the one or more virtual compute instances, and wherein the client is not associated with the different user accounts.

13. A non-transitory, computer-readable storage medium, storing program instructions that when executed by one or more computing devices cause the one or more computing devices to implement:
collecting a stream of raw metering data for individual network communications sent to and from a plurality of virtual compute instances of a multi-tenant provider network, wherein the plurality of virtual compute instances are implemented as part of a multi-tenant provider network for computing resources;
evaluating the stream of raw metering data for possible malicious behavior;
identifying, based at least in part on the evaluation of the stream of raw metering data, one or more virtual compute instances of the plurality of virtual compute instances for storage volume analysis of possible malicious behavior, wherein the one or more virtual compute instances respectively mount one or more block-based storage volumes, wherein access to data stored in the block-based storage volumes is restricted according to an access policy;
subsequent to identification of the one or more virtual compute instances for storage volume analysis, performing an analysis of the data stored on the one or more block-based storage volumes respectively mounted to the identified one or more virtual compute instances according to one or more tests for malicious software, wherein results generated for the one or more tests of the analysis satisfy the access policy for the one or more block-based storage volumes; and
providing the results of the analysis to a client, wherein the client is restricted from accessing the data stored in the one or more block-based storage volumes mounted to the one or more virtual compute instances.

14. The non-transitory, computer-readable storage medium of claim 13, wherein identifying the one or more virtual compute instances for storage volume analysis of possible malicious behavior is performed with respect to one or more malicious behavior criteria, and wherein the program instructions cause the one or more computing devices to further implement:
based, at least in part, on the one or more results of the analysis, performing one or more machine learning techniques to update the one or more malicious behavior criteria for subsequent identification of virtual compute instances for analysis to detect malicious software.

15. The non-transitory, computer-readable storage medium of claim 14, wherein at least one of the malicious behavior criteria is an evaluation that identifies network traffic communications between the one or more virtual compute instances and one or more network addresses associated with malicious behavior.

16. The non-transitory, computer-readable storage medium of claim 13, wherein the program instructions cause the one or more computing devices to further implement:
based, at least in part on the results of the analysis, identifying at least one of the one or more virtual compute instances as compromised with malicious software;
performing a mitigation action with respect to the at least one of the one or more virtual compute instances identified as compromised with malicious software.

17. The non-transitory, computer-readable storage medium of claim 13, wherein, in performing the analysis of the one or more block-based storage volumes, the program instructions cause the one or more computing devices to implement:
capturing the data of the one or more block-based storage volumes to create a respective copy of the one or more block-based storage volumes in a respective logically isolated network within the multi-tenant provider network;
launching an automated confidential analysis agent, within the respective logically isolated network for the one or more block-based storage volumes, wherein the automated confidential analysis agent is configured to access the respective copy to perform the one or more tests without violating the access policy; and sending the results generated for the one or more tests of the analysis to a storage location in the multi-tenant provider network, wherein the storage location is accessible to the client for subsequent access.

18. The non-transitory, computer-readable storage medium of claim 13, wherein the respective one or more block-based storage volumes are root volumes for the one or more virtual compute instances, wherein the multi-tenant provider network maintains a plurality of images of other root volumes that are subsequently mounted to other virtual compute instances, and wherein the program instructions cause the one or more computing devices to further implement:

receiving a request to analyze at least one of the other root volumes; and performing the analysis and the providing of the results generated for the one or more tests of the analysis with respect to the at least one other root volume.

* * * * *